(12) United States Patent
Beaver

(10) Patent No.: US 11,604,927 B2
(45) Date of Patent: Mar. 14, 2023

(54) SYSTEM AND METHOD FOR ADAPTING SENTIMENT ANALYSIS TO USER PROFILES TO REDUCE BIAS

(71) Applicant: Verint Americas Inc., Alpharetta, GA (US)

(72) Inventor: Ian Roy Beaver, Spokane, WA (US)

(73) Assignee: Verint Americas Inc., Alpharetta, GA (US)

( * ) Notice: Subject to any disclaimer, the term of this patent is extended or adjusted under 35 U.S.C. 154(b) by 207 days.

(21) Appl. No.: 16/810,377

(22) Filed: Mar. 5, 2020

(65) Prior Publication Data

US 2020/0311348 A1 Oct. 1, 2020

Related U.S. Application Data

(60) Provisional application No. 62/814,899, filed on Mar. 7, 2019.

(51) Int. Cl.
| | | |
|---|---|---|
| *G06F 40/35* | (2020.01) | |
| *G06Q 30/0204* | (2023.01) | |
| *G06F 40/30* | (2020.01) | |
| *G06N 7/00* | (2023.01) | |

(52) U.S. Cl.
CPC .............. *G06F 40/30* (2020.01); *G06N 7/00* (2013.01)

(58) Field of Classification Search
CPC ......... G10L 25/63; G06F 40/30; G06F 40/35; G06Q 30/0204; G06Q 30/0281
USPC ..................... 704/1, 9, 270; 706/16; 707/748
See application file for complete search history.

(56) References Cited

U.S. PATENT DOCUMENTS

| | | | |
|---|---|---|---|
| 4,914,590 A | 4/1990 | Loatman et al. | |
| 9,460,713 B1 | 10/2016 | Moreno Mengibar et al. | |
| 9,563,622 B1 * | 2/2017 | Anderson | G06F 40/30 |
| 10,515,153 B2 * | 12/2019 | Heilman | G06F 40/30 |
| 10,635,987 B1 * | 4/2020 | Chen | G06N 20/00 |
| 2004/0148154 A1 | 7/2004 | Acero et al. | |
| 2007/0143485 A1 | 6/2007 | Da Palma et al. | |
| 2008/0152121 A1 | 6/2008 | Mandalia et al. | |
| 2008/0270116 A1 * | 10/2008 | Godbole | G06F 40/35 704/9 |
| 2009/0119157 A1 * | 5/2009 | Dulepet | G06F 40/30 705/7.29 |

(Continued)

OTHER PUBLICATIONS

Buda, M., et al., "A systematic study of the class imbalance problem in convolutional neural networks," Neural Networks, vol. 106, 2018, pp. 249-259.

(Continued)

*Primary Examiner* — Martin Lerner
(74) *Attorney, Agent, or Firm* — Meunier Carlin & Curfman LLC

(57) ABSTRACT

Provided is a system and method for adapting sentiment analysis to user profiles to reduce bias in customer or user generated content, specifically a system and method that discounts or adjusts bias in sentiment data based on the channel from which the content was received and/or the demographic of the user. The system includes a means to detect sentiment bias for any product, service, or company across multiple channels of customer data; a means to construct models to quantize bias by specific demographics and channels; and a means to adjust sentiment model output to reduce inflation by biased groups.

18 Claims, 1 Drawing Sheet

(56) References Cited

U.S. PATENT DOCUMENTS

| | | | |
|---|---|---|---|
| 2009/0281870 A1* | 11/2009 | Sun | G06Q 10/10 705/347 |
| 2009/0306967 A1 | 12/2009 | Nicolov et al. | |
| 2011/0029303 A1 | 2/2011 | Mizuguchi et al. | |
| 2013/0110928 A1 | 5/2013 | Ghosh et al. | |
| 2013/0231974 A1* | 9/2013 | Harris | G06Q 30/0201 705/7.29 |
| 2014/0052684 A1* | 2/2014 | Liao | G06F 40/30 706/46 |
| 2014/0095147 A1 | 4/2014 | Hebert et al. | |
| 2014/0095426 A1 | 4/2014 | Nicholson et al. | |
| 2014/0136185 A1 | 5/2014 | Bhatt | |
| 2014/0163959 A1 | 6/2014 | Hebert et al. | |
| 2014/0372226 A1* | 12/2014 | Pavley | G06Q 30/0269 705/14.66 |
| 2016/0098480 A1* | 4/2016 | Nowson | G06F 40/30 707/738 |
| 2016/0162779 A1 | 6/2016 | Marcus et al. | |
| 2017/0048109 A1 | 2/2017 | Kant et al. | |
| 2017/0235830 A1* | 8/2017 | Smith | G06F 40/30 707/748 |
| 2017/0249389 A1 | 8/2017 | Brovinsky et al. | |
| 2018/0052910 A1 | 2/2018 | Allen et al. | |
| 2018/0374482 A1 | 12/2018 | Woo et al. | |
| 2019/0087728 A1 | 3/2019 | Agarwal et al. | |
| 2019/0147371 A1 | 5/2019 | Deo et al. | |
| 2019/0236617 A1 | 8/2019 | Gholston et al. | |
| 2020/0081865 A1 | 3/2020 | Farrar et al. | |
| 2020/0090284 A1* | 3/2020 | Anders | G06Q 50/01 |
| 2020/0142963 A1* | 5/2020 | Chen | G06F 40/30 |
| 2020/0151251 A1* | 5/2020 | Barachha | G06F 40/30 |
| 2020/0342470 A1* | 10/2020 | Morningstar | G06Q 30/0203 |
| 2021/0034708 A1* | 2/2021 | Prasad | G06F 40/30 |
| 2021/0192552 A1* | 6/2021 | Gugnani | G06F 40/30 |

OTHER PUBLICATIONS

Bolukbasi, T., et al., "Man is to Computer Programmer as Woman is to Homemaker? Debiasing Word Embeddings," arXiv: 1607.06520v1, 2016, 25 pages.

Bhaskar, J., et al., "Hybrid Approach for Emotion Classification of Audio Conversation Based on Text and Speech Mining," International Conference on Information and Communication Technologies (ICICT 2014), Procedia Computer Science, vol. 46, 2015, pp. 635-643.

Brill, E., "Transformation-Based Error-Driven Learning and Natural Language Processing: A Case Study in Part-of-Speech Tagging," Association for Computational Linguistics, 1995, 24 pages.

Correa, T., et al., "Who interacts on the Web?: The intersection of users' personality and social media use," Computers in Human Behavior, vol. 26, No. 2, 2010, pp. 247-253.

Dumoulin, J., "Using Multiple Classifiers to Improve Intent Recognition in Human Chats," MAICS, 2014, 6 pages.

Kim, Y-B., et al., "*Onenet*: Joint Domain, Intent, Slot Prediction for Spoken Language Understanding," IEEE Automatic Speech Recognition and Understanding Workshop (ASRU), 2017, 7 pages.

Kim, B., et al., "Two-stage multi-intent detection for spoken language understanding," Multimedia Tools and Applications, 2016, 14 pages.

Kuhn, R., et al., "The Application of Semantic Classification Trees to Natural Language Understanding," IEEE Transactions on Pattern Analysis and Machine Intelligence, vol. 17, No. 5, 1995, pp. 449-460.

Lison, P., "Structured Probabilistic Modelling for Dialogue Management," Ph.D. Thesis, Department of Informatics, Faculty of Mathematics and Natural Sciences, University of Oslo, Oct. 30, 2013, 30 Pages.

Ratnaparkhi, A., "A Maximum Entropy Model for Part-of-Speech Tagging," Conference on Empirical Methods in Natural Language Processing (EMNLP), 1996, 10 pages.

Xu, H., et al., "LLT-PolyU: Identifying Sentiment Intensity in Ironic Tweets," Proceedings of the 9th International Workshop on Semantic Evaluation (SemEval 2015), Association for Computational Linguistics, 2015, pp. 673-678.

Search Report, dated Apr. 16, 2020, received in connection with corresponding EP Patent Application No. 20161571.3.

* cited by examiner

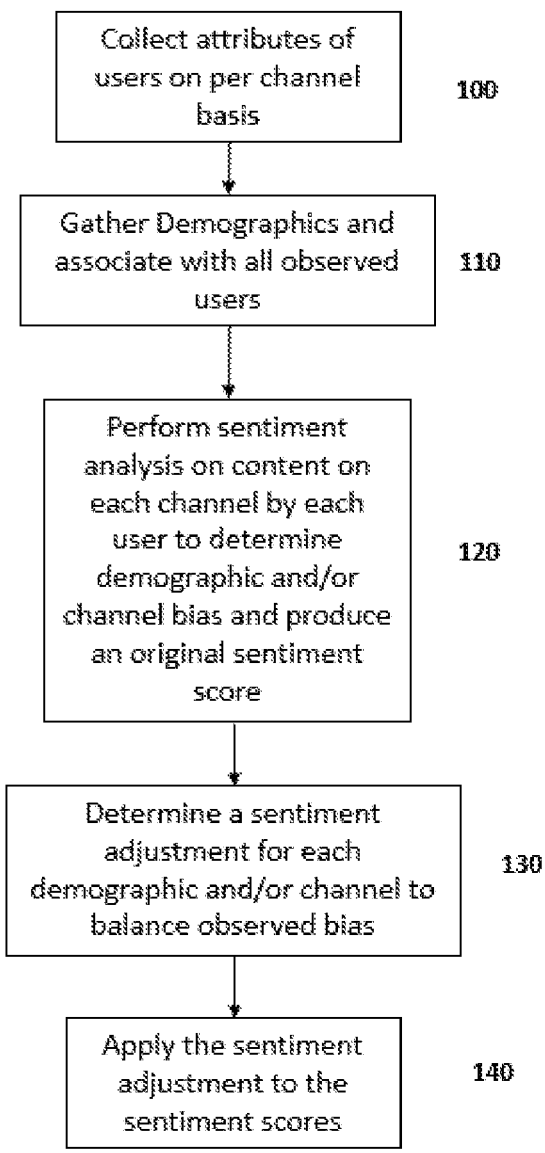

SYSTEM AND METHOD FOR ADAPTING SENTIMENT ANALYSIS TO USER PROFILES TO REDUCE BIAS

This application claims priority to U.S. Provisional Patent Application Ser. No. 62/814,899, filed Mar. 7, 2019, which is hereby incorporated by this reference in its entirety as if fully set forth herein.

BACKGROUND

Field

Embodiments of the present invention relate to a system and method for adapting sentiment analysis to user profiles to reduce bias in customer or user generated content, specifically a system and method that discounts bias based on the channel from which the content was received.

Background

Modern companies use multiple communication channels or platforms to engage with their customers, handle support requests, as well as to gather feedback and monitor brand perception. Within these channels company specific content is generated as customers ask questions and receive answers from employees and representatives over phone calls, e-mails, chat, and social platforms such as Twitter and Facebook.

An important aspect of customer feedback regardless of channel is their sentiment about the topic. For example, if customers are upset they may use language and tone that will indicate this, even if they do not say outright that the issue is upsetting them. Sentiment analysis aims to identify the polarity (positive or negative) and intensity of certain texts in order to shed light on people's sentiments, perceptions, opinions, and beliefs about a particular product, service, scheme, etc. [1]. By applying sentiment analysis to customer service texts, it is possible to determine if a product or service is upsetting or satisfying customers and to what degree. Conventional or known sentiment analysis procedures use demographic information to categorize the sentiment of reviewers in product or service reviews [3, 4].

BRIEF SUMMARY OF THE DISCLOSURE

Accordingly, the present invention is directed to the system and method for adapting sentiment analysis to user profiles to reduce bias that obviates one or more of the problems due to limitations and disadvantages of the related art.

In accordance with the purpose(s) of this invention, as embodied and broadly described herein, this invention, in one aspect, relates to a of reducing sentiment bias in sentiment analysis scores, the method including one or more processing devices performing operations including collecting attributes of users on a per channel basis; gathering demographics and associating the demographics with all observed users; performing sentiment analysis on content on each channel by each user to determine bias in a segment of the content to produce an original sentiment score; determining a sentiment adjustment factor based on the bias; applying the sentiment adjustment factor to the original sentiment score to compensate for the bias; and generating an adjusted sentiment score.

In another aspect, the invention relates to a system comprising: a processing device; and a memory device in which instructions executable by the processing device are stored for causing the processor to collect attributes of users on a per channel basis; gather demographics and associating the demographics with all observed users; perform sentiment analysis on content on each channel by each user to determine bias in a segment of the content to produce an original sentiment score; determine a sentiment adjustment factor based on the bias; apply the sentiment adjustment factor to the original sentiment score to compensate for the bias; and generate an adjusted sentiment score.

In yet another aspect, the invention relates to a non-transitory computer-readable storage medium having program code that is executable by a processor to cause a computing device to perform operations, the operations comprising: collecting attributes of users on a per channel basis; gathering demographics and associating the demographics with all observed users; performing sentiment analysis on content on each channel by each user to determine bias in a segment of the content to produce an original sentiment score; determining a sentiment adjustment factor based on the bias; applying the sentiment adjustment factor to the original sentiment score to compensate for the bias; and generating an adjusted sentiment score.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the system and method for adapting sentiment analysis to user profiles to reduce bias, as well as the structure and operation of the various embodiments of the system and method for adapting sentiment analysis to user profiles to reduce bias, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate system and method for adapting sentiment analysis to user profiles to reduce bias. Together with the description, the figures further serve to explain the principles of the system and method for adapting sentiment analysis to user profiles to reduce bias described herein and thereby enable a person skilled in the pertinent art to make and use the system and method for adapting sentiment analysis to user profiles to reduce bias.

FIG. 1 is flowchart illustrating a method for adapting sentiment analysis to user profiles to reduce bias according to principles described herein.

DETAILED DESCRIPTION

Reference will now be made in detail to embodiments of the system and method for adapting sentiment analysis to user profiles to reduce bias with reference to the accompanying figures. The same reference numbers in different drawings may identify the same or similar elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Some customer groups may be more prone to use social media than other groups, and within these groups several factors may influence the predominant sentiment of a product or service on social media leading to bias when determining overall customer sentiments. For example, social media has been shown to be used more by emotionally unstable people regardless of gender, age, race, or life satisfaction [2]. Therefore, traditional customer service channels or platforms, such as chat or e-mail may show a different sentiment than the social media channels for a similar customer demographic. In spite of this, we do not wish to discard social media data altogether as it is an important and prevalent form of customer service. Instead, by considering the demographics of the customer when calculating their sentiment towards a product, service, or company, potential bias can be reduced or "discounted" to provide a more realistic picture of overall customer sentiment across multiple channels.

To improve the objectivity of information provided by the regression analysis and to reduce computational complexity of the optimization problem, thereby saving computational resources, such as CPU times and memory spaces, rather than merely categorizing sentiment of reviews, the present system and method modifies sentiment models themselves based on the demographics of the customer in any customer service interaction. For example, knowing that 80% of people over the age of 65 dislike product X, the degree of negativity on negative customer interactions for product X can be identified and reduced for any customers over the age of 65. The amount the negativity can be scaled proportionally to the association of customer's demographics to a negative sentiment for the current topic. By scaling or balancing the output of the sentiment model, a more objective customer sentiment level can be obtained, thus improving existing technological processes involving machine-learning techniques. Note that if a product receives widespread positive or negative attention regardless of demographics, the net information produced by the sentiment model will remain the same (customer feedback is positive or negative, respectively). This method will not flip sentiment polarity; it will reduce the bias to inflate polarity by specific customer groups on specific channels.

The method provided herein includes the following steps, which may be performed in several parts. The first is to build a demographic profile of the customer base across all channels of customer service, communities, and social media. The second is to group all of the interactions around common products, topics or services. Next, a model is constructed which surfaces any correlations between specific customer attributes and channels and the resulting sentiment polarity. This is repeated for each product, topic, or service. Then, these models are used to scale the sentiments of specific customer demographics when performing sentiment analysis on an individual customer, content, channel, or service as a whole.

Referring to FIG. 1, first, all known customer attributes are collected on a per channel basis. 100. For channels where the customer identification is known, such as live chat or e-mail, customer demographic information will be also be known, e.g., by the company. For external channels such as social media, profile information customers have entered across social media channels for which they have accounts can be used as a resource for collecting demographic information. Moreover, social media accounts may provide links or contact information for other social media or accessible demographic information. For example, a user on LinkedIn may include his/her Twitter and Pinterest account links on his/her LinkedIn profile page. By joining or accessing the three linked identified social media accounts, a more complete demographic of that user can be collected/developed. While this example illustrates three social media platforms linked, it can be appreciated that numerous social media or customer profiles can be associated with one another and accessed by the present system to collect demographic data for a user or users. Thus, user/customer demographics are gathered and then associated with all observed users on each channel 110.

Once user/customer demographics are gathered and associated with all observed users on each channel, traditional sentiment analysis is performed on all content created on each channel by each user. 120. This can be performed in parallel on a distributed compute cluster, as each user and channel may be an independent data point. Once the sentiment is extracted, a regression analysis is performed similarly, which will measure the tendency for a particular demographic to have more positive or negative sentiment than the population has a whole. An exemplary regression analysis is provided in Teresa Correa, Amber Willard Hinsley, and Homero Gil De Zuniga. Who interacts on the web?: The intersection of users personality and social media use. *Computers in Human Behavior,* 26(2):247-253, 2010, which is hereby incorporated by reference in pertinent part as if disclosed herein. The regression analysis can be performed at the product or service level and also at the channel level to decide where the bias resides. Using these models, a sentiment profile can be constructed at any resolution desired (i.e., per user, per product, per channel). This sentiment analysis provides an original set of sentiment scores and will illustrate sentiment bias among various user demographics and/or channel. Using the sentiment scores from the regression analysis and the illustrated sentiment bias, an adjustment value (or value by which to "discount" observed bias) based on the user demographic and/or channel (measured bias) can be determined and applied to the feedback obtained from users/customers (e.g., the original sentiment scores). 130/140.

Once sentiment profiles are constructed, sentiment scores from the original analysis can be adjusted using the measured bias. For example, if young male Twitter users tend to be highly critical of a new product, for instance, but the Twitter population as a whole is not, any tweets originating from young males can be adjusted by a negative bias inflation factor from the model. In doing so, a highly biased population will have less of an inflationary factor when doing sentiment analysis.

Accordingly, provided herein are a means to detect sentiment bias for any product, service, or company across multiple channels of customer data; a means to construct models to quantize bias by specific demographics and channels; and a means to adjust sentiment model output to reduce inflation by biased groups.

The present framework may be performed by a computer system or processor capable of executing program code to perform the steps described herein. For example, system may be a computing system that includes a processing system, storage system, software, communication interface and a user interface. The processing system loads and executes software from the storage system. When executed by the computing system, software module directs the processing system to operate as described in herein in further detail, including execution of the cross-entropy ranking system described herein.

The processing system can comprise a microprocessor and other circuitry that retrieves and executes software from a storage system. Processing system can be implemented within a single processing device but can also be distributed across multiple processing devices or sub-systems that cooperate in existing program instructions. Examples of processing system include general purpose central processing units, applications specific processors, and logic devices, as well as any other type of processing device, combinations of processing devices, or variations thereof.

The storage system can comprise any storage media readable by processing system, and capable of storing software. The storage system can include volatile and non-volatile, removable and non-removable media implemented in any method or technology for storage of information, such as computer readable instructions, data structures, program modules, or other data. Storage system can be implemented as a single storage device but may also be implemented across multiple storage devices or sub-systems. Storage system can further include additional elements, such a controller capable, of communicating with the processing system.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the store media can be a non-transitory storage media. In some implementations, at least a portion of the storage media may be transitory. It should be understood that in no case is the storage media a propagated signal.

Throughout this application, various publications may have been referenced. The disclosures of these publications in their entireties are hereby incorporated by reference into this application in order to more fully describe the state of the art to which this invention pertains.

[1] Hongzhi Xu, Enrico Santus, Anna Laszlo, and Chu-Ren Huang. Llt-polyu: identifying sentiment intensity in ironic tweets. In *Proceedings of the 9th International Workshop on Semantic Evaluation* (*SemEval* 2015), *Association for Computational Linguistics*, pages 673-678, 2015.

[2] Teresa Correa, Amber Willard Hinsley, and Homero Gil De Zuniga. Who interacts on the web?: The intersection of users personality and social media use. *Computers in Human Behavior*, 26(2):247-253, 2010.

[3] Dhruv A Bhatt. Sentiment analysis based on demographic analysis, 2014. U.S. patent application Ser. No. 13/675,653.

[4] Nicolas Nicolov, William Allen Tuohig, and Richard Hansen Wolniewicz. Automatic sentiment analysis of surveys, 2009. U.S. patent application Ser. No. 12/481,398.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A method of improving objectivity of an outcome of regression analysis across a plurality of customer service channels, wherein each customer service channel is an electronic platform, the method including one or more processing devices performing operations comprising:
   building demographic profiles for users in interactions across the plurality of customer service channels, wherein the customer service channel is chat, email, telephonic, or a social media platform;
   grouping all of the interactions around a common product, topic or service to produce at least one grouping of interactions;
   performing sentiment analysis on content of each grouping by each user on each customer service channel based on the demographic profiles and each customer service channel to quantize bias in a segment of the content by specific demographic and channel to produce an original sentiment score for each grouping;
   performing a regression analysis on the content of each grouping to determine where sentiment bias resides for a particular combination of user demographic and customer service channel and constructing a model of correlations between specific customer attributes, customer service channels, and sentiment polarity according to the regression analysis for each grouping;
   determining a sentiment adjustment factor based on the correlations; and
   applying the sentiment adjustment factor to the original sentiment score to compensate for the sentiment bias in feedback obtained from the particular combination of user demographic and customer service channel for the grouping.

2. The method of claim 1, wherein the regression analysis is performed on content created on each customer service channel by each user.

3. The method of claim 1, wherein the regression analysis is performed in parallel via a distributed computer cluster.

4. The method of claim 3, wherein the parallel performing of the regression analysis is disturbed according to each customer service channel.

5. The method of claim 1, further comprising measuring via the sentiment analysis a tendency for a certain demographic to have a more positive or negative sentiment than a population of users as a whole and wherein the sentiment adjustment factor measures take into account this tendency.

6. The method of claim 1, further comprising measuring via the sentiment analysis a tendency for communication via a certain customer service channel to have a more positive or negative sentiment than customer service channels as a whole and wherein the sentiment adjustment factor measures take into account this tendency.

7. A system improving objectivity of an outcome of regression analysis across a plurality of customer service channels, wherein each customer service channel is an electronic platform, comprising:
   a memory comprising executable instructions; and
   a processor configured to execute the executable instructions and cause the system to:
   building demographic profiles for users in interactions across the plurality of customer service channels, wherein the customer service channel is chat, email, telephonic, or a social media platform;
group all of the interactions around a common product, topic or service to produce at least one grouping of interactions;
perform sentiment analysis on content of each grouping by each user on each customer service channel based on the demographic profiles and each customer service channel to quantize bias in a segment of the content by specific demographic and channel to produce an original sentiment score for each grouping;
perform a regression analysis on the content of each grouping to determine where sentiment bias resides for a particular combination of user demographic and user channel and construct a model of correlations between specific customer attributes, customer service channels, and sentiment polarity according to the regression analysis for each grouping;
determine a sentiment adjustment factor based on the correlations; and
apply the sentiment adjustment factor to the original sentiment score to compensate for the sentiment bias in feedback obtained from the particular combination of user demographic and customer service channel for the grouping.

8. The system of claim 7, wherein the regression analysis is performed on content created on each customer service channel by each user.

9. The system of claim 7, wherein the regression analysis is performed in parallel via a distributed computer cluster.

10. The system of claim 9, wherein the parallel performing of the regression analysis is disturbed according to each customer service channel.

11. The system of claim 7, the memory further comprising executable instructions, that cause the system to measure, via the sentiment analysis, a tendency for a certain demographic to have a more positive or negative sentiment than a population of users as a whole and wherein the sentiment adjustment factor measures take into account this tendency.

12. The system of claim 7, the memory further comprising the memory further comprising executable instructions, that cause the system to measure, via the sentiment analysis, a tendency for communication via a certain customer service channel to have a more positive or negative sentiment than customer service channels as a whole and wherein the sentiment adjustment factor measures take into account this tendency.

13. A non-transitory computer-readable storage medium comprising instructions that, when executed by a processor of a processing system, cause the processing system to perform a method, the method comprising:

building demographic profiles for users in interactions across a plurality of customer service channels, wherein the customer service channel is chat, email, telephonic, or a social media platform;
grouping all of the interactions around a common product, topic or service to produce at least one grouping of interactions;
performing sentiment analysis on content of each grouping by each user on each customer service channel based on the demographic profiles and each customer service channel to quantize bias in a segment of the content by specific demographic and channel to produce an original sentiment score for each grouping;
performing a regression analysis on the content of each grouping to determine where sentiment bias resides for a particular combination of user demographic and customer service channel and constructing a model of correlations between specific customer attributes, customer service channels, and sentiment polarity according to the regression analysis for each grouping;
determining a sentiment adjustment factor based on the correlations; and;
applying the sentiment adjustment factor to the original sentiment score to compensate for the sentiment bias in feedback obtained from the particular combination of user demographic and customer service channel for the grouping.

14. The non-transitory computer-readable storage medium of claim 13, wherein the regression analysis is performed on content created on each customer service channel by each user.

15. The non-transitory computer-readable storage medium of claim 13, wherein the regression analysis is performed in parallel via a distributed computer cluster.

16. The non-transitory computer-readable storage medium of claim 15, wherein the parallel performing of the regression analysis is disturbed according to each customer service channel.

17. The non-transitory computer-readable storage medium of claim 13, the method further comprising measuring via the sentiment analysis a tendency for a certain demographic to have a more positive or negative sentiment than a population of users as a whole and wherein the sentiment adjustment factor measures take into account this tendency.

18. The non-transitory computer-readable storage medium of claim 13, the method further comprising measuring via the sentiment analysis a tendency for communication via a certain customer service channel to have a more positive or negative sentiment than customer service channels as a whole and wherein the sentiment adjustment factor measures take into account this tendency.

* * * * *